UNITED STATES PATENT OFFICE.

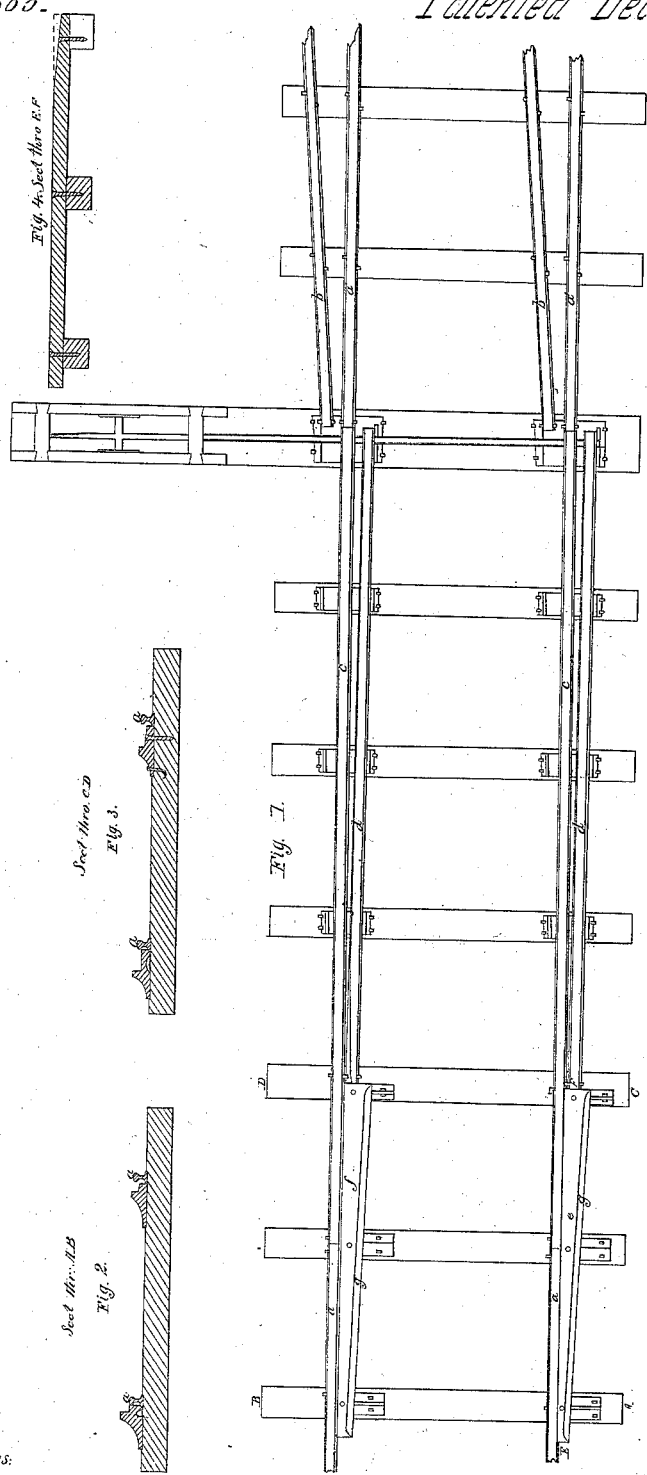

GUSTAVUS A. NICOLLS, OF READING, PENNSYLVANIA.

SAFETY-SWITCH FOR RAILROADS.

Specification of Letters Patent No. 3,865, dated December 19, 1844.

*To all whom it may concern:*

Be it known that I, GUSTAVUS A. NICOLLS, of Reading, in the county of Berks and State of Pennsylvania, have invented a new and improved safety-switch for railroads by which engines and cars moving over the switch or movable rail leading into a turnout are guided and kept upon the right track when the above switch is found either through accident or design set wrong; and I do hereby declare that the following is a full and exact description.

The nature of my invention consists in the employment of parallel bars attached to, and moving with the switch to form the connection between the tracks at the opposite ends of the switch when it is shifted in combination with inclined planes and guides at one end of these parallel bars to carry, elevate, and guide the wheels over and into the main track.

In the accompanying drawings, which make a part of this specification, Figure 1, is a plan of my improved switch; Fig. 2, a transverse or cross section at the line A B, Fig. 3, a transverse section of the line C D, and Fig. 4 a longitudinal section at the line E F, all on Fig. 1.

$a, a, a', a'$, are the rails of the main track at each end of the switch, and $b, b$, the rails of the turnout: $c, c$, are the switch rails, fixed at one end to the rails $a, a$, and movable at the other according to any of the known methods to form the connection, either with the main track $a, a$, or the turnout, $b, b$. To these switch rails are attached two parallel bars, $d, d$, at a sufficient distance to leave a free passage way for the flanges of the wheel like the switches, they are fixed at one end, and movable at the other, so that, when the switches are shifted from the main track $a, a$, to the turnout track, $b, b$, the bars $d, d$, are in connection with the main track, and will receive the wheels of a train of cars from the main track, $a, a$, in case of an omission to throw back the switch. And for the purpose of forming the connection between these parallel bars at their fixed ends and the main track $a, a$, there are two inclined planes $e, f,$ the one $e$, on the outside of the rail inclined longitudinally, to elevate the flange of the wheel gradually to the level of the rail $a$, that it may pass from the outside to the inside of it, the wheels being guided laterally by a guide flange $g, g$, on each of the planes, and the other, $f$, on the inside of the other rail $a$, to receive the flange of the other wheel, and sustain it until the tread of the wheel reaches the rail, $a$; this plane being inclined transversely, toward the rail $a$, to assist the flange guides, $g, g$, in guiding the wheels to the main track. The plane $f$, should have a slight longitudinal inclination, at the end next the safety bar, to elevate the tread of the wheel, a little above the level of the main track, and thus enable the lateral inclined plane and guide flanges to guide the tread of the wheel on to the main track.

It is evident, that this improvement is applicable to sidelings—by doubling the number of safety bars, inclined planes and guides.

What I claim as my invention and desire to secure by Letters Patent is—

A safety turnout switch, embodying the combined use of inclined planes and guides to elevate and slide the wheels on the track, and the combination of these planes and guides with the safety bars.

GUSTAVUS A. NICOLLS.

Witnesses:
HENRY A. MUHLENBERG,
JOSEPH L. STRIKTER.